United States Patent [19]
Dohse et al.

[11] Patent Number: 5,269,006
[45] Date of Patent: Dec. 7, 1993

[54] METHOD AND APPARATUS FOR ARBITRATING ACCESS TO A MICROPROCESSOR HAVING REAL AND PROTECTED MODES

[75] Inventors: William F. Dohse, Plymouth; Ronald J. Larson, Minneapolis; Richard Mansfield, Bloomington, all of Minn.

[73] Assignee: Micral, Inc., New Brighton, Minn.

[21] Appl. No.: 866,948

[22] Filed: Apr. 8, 1992

Related U.S. Application Data

[63] Continuation of Ser. No. 463,430, Jan. 11, 1990, abandoned.

[51] Int. Cl.$^5$ ............................................. G06F 13/32
[52] U.S. Cl. ........................... 395/325; 364/DIG. 1; 364/242.31; 364/232.9; 364/246.91; 364/242.21; 395/500
[58] Field of Search ............... 395/325, 425, 500, 725

[56] References Cited

U.S. PATENT DOCUMENTS

| | | | |
|---|---|---|---|
| 4,779,187 | 10/1988 | Letwin | 364/200 |
| 4,787,032 | 11/1988 | Culley | 364/200 |
| 4,825,358 | 4/1989 | Letwin | 364/200 |
| 4,891,752 | 1/1990 | Fairman et al. | 364/200 |
| 4,987,529 | 1/1991 | Craft et al. | 364/200 |
| 5,083,259 | 1/1992 | Maresh et al. | 395/325 |
| 5,109,521 | 4/1992 | Culley | 395/800 |

*Primary Examiner*—Kevin A. Kriess
*Attorney, Agent, or Firm*—Davis & Schroeder

[57] ABSTRACT

A microprocessor access arbitration network which arbitrates among HOLD, RESET and REFRESH request commands by controlling a preempt bus so that a system memory refresh cycle is never delayed by a DMA or bus master operation is described. If a HOLD request is in progress for an operation other than a REFRESH cycle when a REFRESH cycle is initiated, that HOLD request is delayed while the REFRESH cycle proceeds to completion.

12 Claims, 18 Drawing Sheets

METHOD AND APPARATUS FOR ARBITRATING ACCESS TO A MICROPROCESSOR HAVING REAL AND PROTECTED MODES

CROSS REFERENCE RELATED APPLICATION

This is a continuation of application No. 07/463,430, filed Jan. 11, 1990, now abandoned.

BACKGROUND OF THE INVENTION

This invention relates to computers designed with commercially available microprocessor chip sets. More particularly, the present invention relates to personal computers in which commercially available microprocessor chips are used and compatibility is maintained with existing application programs which were designed for use on personal computers employing incompatible microprocessor chip sets.

Popular microprocessor chip sets widely used by microcomputer manufacturers include the 8088, the 8086 and the 80286 microprocessors, all manufactured by Intel Corporation (hereafter "Intel"), and having similar instruction sets. Similar instruction sets are also available for a later generation microprocessor from Intel, namely, the 80386 microprocessor. Intel also produces a coprocessor chip, the 80287, which may be used either with the 80286 or the 80386 microprocessor chips to achieve even higher execution throughput rates. The 80286 and 80386 microprocessor chips are fully described in the "Microprocessor and Peripheral Handbook", published by Intel Corporation, 1987, and is incorporated by reference as if fully set forth herein.

Among the features of the 80286 is extended address space in the so-called "protected" mode of the microprocessor (hereafter also "central processing unit", "CPU" or "processor"). However, application programs which use the extended address space in the protected mode can return to the so-called "real" mode of the microprocessor only by resetting the microprocessor by generating a microprocessor RESET cycle. In the 80286 microprocessor, resetting the microprocessor does not disturb the state of the rest of the personal computer system (hereafter also "microcomputer" or "system") because many other types of operations can occur while the CPU is being reset.

Operations can occur during a microprocessor RESET cycle in microcomputers utilizing the 80286-type microprocessor because that type of microprocessor recognizes and retains a HOLD request from microcomputer subsystems external of the microprocessor itself during a microprocessor RESET cycle. Thus, system direct memory access (DMA), bus master and system memory refresh (REFRESH) operations, all of which utilize the HOLD request command, can occur while the CPU is being reset. This feature in the 80286 microprocessor, namely to recognize a HOLD request during a RESET cycle (hereafer "HOLD-during-RESET" feature), was eliminated in the 80386 microprocessor chip. Thus, in this respect, the 80386 chip clearly is not compatible with the 80286 microprocessor chip.

Many computer programmers took advantage of the ability of the 80286 microprocessors to run application programs in so-called "real" and "protected" modes and implemented this capability while developing applications software packages. Thus, many applications software packages designed for use on microcomputers using an 80286 microprocessor chip utilize the HOLD-during-RESET feature. Those programs therefore, are also incompatible for execution on any microcomputer utilizing the 80386 microprocessor chip.

In order to assure continued commercial demand for already developed applications software packages and to enhance the demand for computers using the 80386 microprocessor chip, means for making programs written for microcomputers utilizing the 80286 microprocessor compatible with microcomputers utilizing the new 80386 microprocessor is necessary. Of course, such means should provide the needed compatibility to execute a majority of the applications without having to reprogram the software packages to execute on microcomputers using the 80386 microprocessor, or to redesign the 80386.

In the pertinent prior art, U.S. Pat. No. 4,787,032 describes a circuit and related logic for arbitrating microprocessor access during a RESET cycle. As described, the circuit and logic retains the HOLD request until the RESET cycle has been completed or, conversely, if a HOLD request is being processed when a RESET cycle is requested, the RESET request is retained until the HOLD request has been completed. Thus, if used with the circuit and logic described, the 80386 may be reset without losing a HOLD request. However, the teaching of U.S. Pat. No. 4,787,032 arbitrates all RESET and HOLD requests uniformly without regard to the nature of the operations utilizing HOLD request commands.

In microcomputer systems which utilize the HOLD-during-RESET feature, memory REFRESH, DMA slave and bus master operations all utilize the HOLD request command. While such operations must wait for completion of a microprocessor RESET operation, it is not desirable to force a memory REFRESH operation to wait for completion of a DMA slave or bus master operation. Even if user data or program information is not actually lost, delay of a memory REFRESH operation at least jeopardizes the integrity of and timely access to such data or information.

Therefore, it is desirable to provide a microcomputer with a later generation microprocessor which is capable of executing applications software programs written for earlier generations of microcomputers using the older generation microprocessors. In addition, it is desirable to provide such a microcomputer without having to redesign the new CPU chip or reprogram applications software packages. Finally, it is also desirable that in such a microcomputer, the integrity of user data and program information is neither lost or jeopardized by the method and apparatus for achieving such compatibility.

SUMMARY OF THE INVENTION

The microprocessor access arbitration network according to the present invention provides applications software compatibility among microcomputers utilizing either the 80286 or 80386 microprocessor or any similar CPU having real and protected modes which does not provide control of HOLD request commands while being reset from the protected to real mode. The present invention does not require reprogramming of the software packages or redesigning of the microprocessors, or jeopardize the integrity of user data or program instructions stored in the microcomputer DRAM memory.

The arbitration network of the present invention arbitrates among HOLD, RESET and REFRESH request commands by controlling a preempt bus so that a memory refresh cycle is never delayed by a DMA or bus master operation. Thus, the network of the present invention never produces a HOLD request command which results from arbitration of a memory refresh request with a DMA request.

In accordance with the present invention, if a REFRESH operation is in progress when a RESET cycle is initiated, the REFRESH operation is allowed to finish; conversely, if a RESET operation is in progress when a REFRESH cycle is initiated, then the RESET cycle is allowed to finish. However, if a HOLD request (HOLDR) is in progress for an operation other than a REFRESH cycle when a REFRESH cycle is initiated, that HOLDR is delayed (i.e. preempted) while the REFRESH cycle proceeds to completion.

DESCRIPTION OF THE DRAWING

For fuller understanding of the present invention, reference is made to the accompanying drawing in the following detailed Description of the Preferred Embodiment of the invention. In the drawing.

Figure 1:
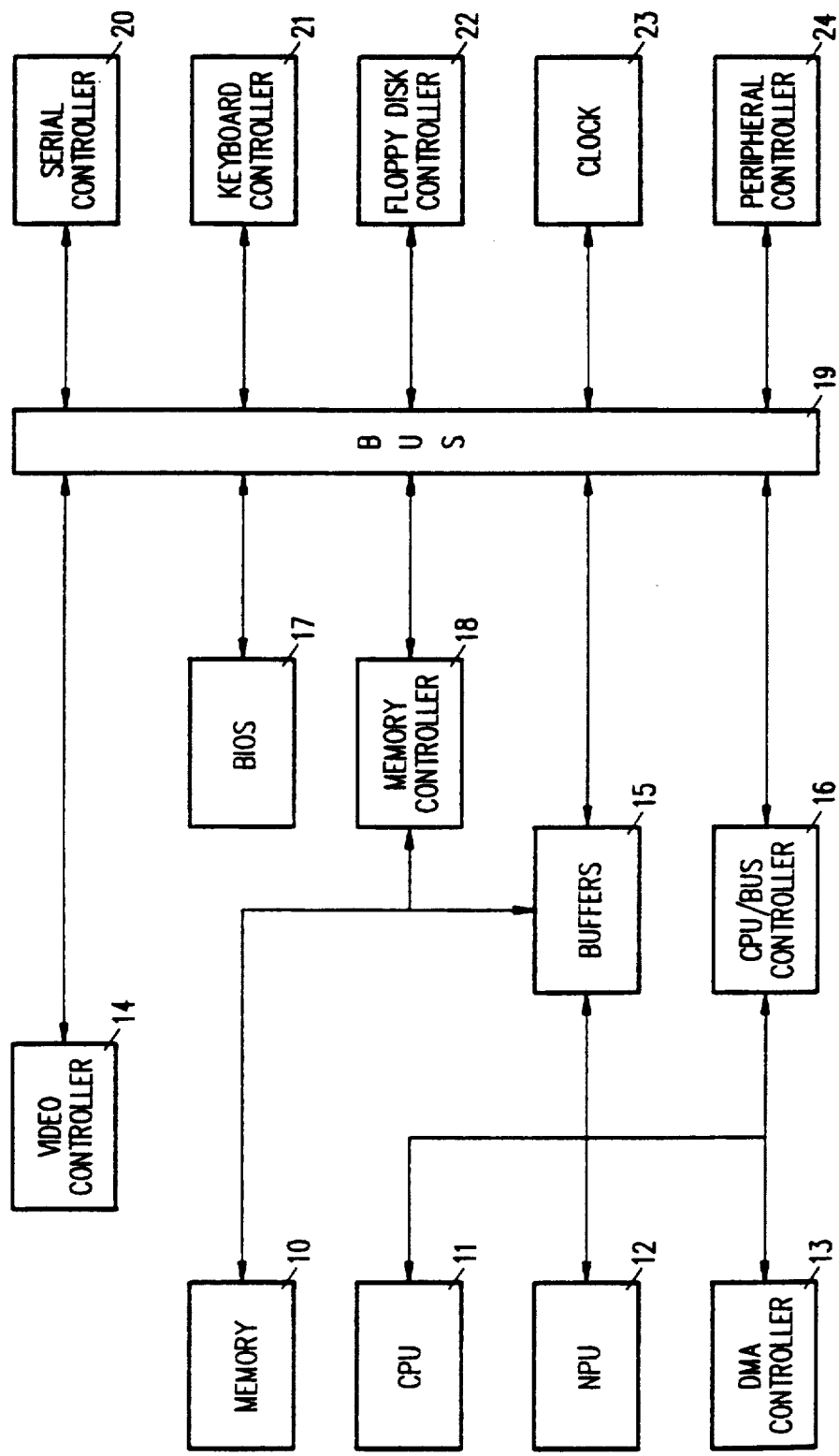
FIG. 1 is a functional block diagram of the computer architecture in which the network of the present invention may be used.

Reference numbers refer to the same or equivalent parts of the present invention throughout the several figures of the drawing.

DESCRIPTION OF THE PREFERRED EMBODIMENT

A microprocessor access arbitration network (hereafter also "network") constructed according to the principles of the present invention may be employed in computer systems having various configurations and architectures. One such architecture is shown in FIG. 1 for a typical microcomputer system.

Figure 2:
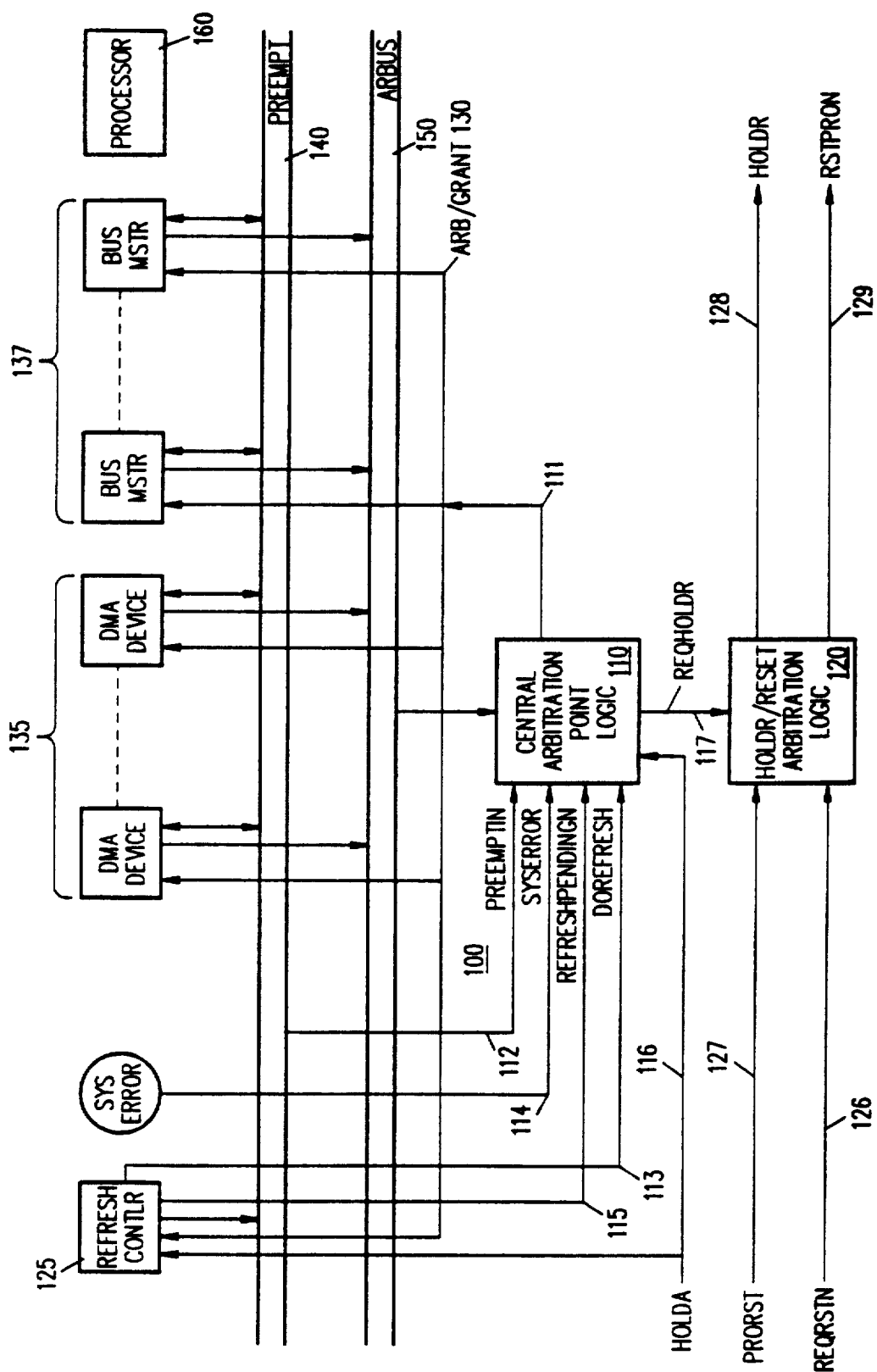
FIG. 2 is a functional block diagram of a microprocessor access arbitration network according to the principles of the present invention.

Access arbitration network 100 of the present invention, as shown in FIG. 2, includes central arbitration point (CAP) logic 110, HOLDR/RESET arbitration logic 120 and REFRESH controller 125. The network further includes ARBITRATION/GRANT (ARB/GRANT) signal 130, preempt bus 140 and ARBITRATION BUS (ARBUS) 150, all of which being coupled to CAP logic 110. CAP logic 110 is also coupled to microprocessor 160, which may be any 80386-type microprocessor.

CAP logic 110, according to the present invention, controls access of DMA devices 135 or bus masters 137 to state-of-the-art system bus technology, such as the MICRO CHANNEL ARCHITECTURE (MCA) manufactured by IBM Corporation, by GRANTN control line 111. ARBUS 150 is a four-bit bus that is used by DMA devices or bus masters to set bus use priority among the devices and masters coupled through their respective controllers. DMA devices or bus masters can have level 0-E Hex and microprocessor 160 defaults to level F.

With continuing reference to FIG. 2, CAP 110 withholds access to the system bus if REFRESHPENDING signal 115 is active. Thus, even if PREEMPTIN 112 is received in the presence of REFRESHPENDING signal 115, CAP 110 allows the refresh operation to occur when processor 160 relinquishes the system bus and sets HOLDA signal 116 active by keeping ARB/GRANT signal 130 in ARB state. If REFRESHPENDING is not timely serviced, namely every 15 microseconds, a system error is initiated.

In the present invention, if HOLD/RESET arbitration logic 120 detects a reset request in the presence of an active HOLD request, a reset command is issued after the HOLD request is deactivated. Conversely, if HOLDR/RESET arbitration logic 120 detects a HOLD request in the presence an active reset operation, a HOLD request is issued after the reset operation is completed. Further in accordance with the present invention, since a HOLD request for a system memory REFRESH operation has priority over a HOLD request for a DMA operation, a memory refresh request is never arbitrated with a DMA request.

As indicated elsewhere in this specification, REFRESH controller 125 is responsible for periodically refreshing the state of the system memory, which typically comprises dynamic random access memory or "DRAM" (not shown), to maintain the integrity of system data and program instructions. REFRESH controller 125 comprises well-known memory address generation circuits, bus cycle generation logic and a counter for refreshing system memory cells. The design of REFRESH controller 125 forms no part of the present invention.

PREEMPT bus 140 is a one-bit bus, having open collector-active low circuit configuration, and is used by DMA devices 135, bus masters 137 or refresh controller 125 to communicate their request for access to the system memory or other parts of the microcomputer system via the MCA. While the priority for any one of the DMA devices 135 or bus masters 137 can vary, at no time is such priority greater than either a system error (e.g., NMI) or a memory REFRESH.

ARB/GRANT signal 130 is used by CAP logic 110 to communicate with DMA devices 135 or bus masters 137 whether or not a given device has been granted control of the MCA (not shown). A summary of the functions performed by CAP logic 110 via ARB/GRANT signal 130 and HOLDR signal 128 is given below.

---

SETARB

1) IF THE BUS IS GRANTED TO A DEVICE OTHER THAN THE PROCESSOR, AND THE CURRENT BUS TRANSFER HAS BEEN COMPLETED, AND THERE

-continued

HAS BEEN SUFFICIENT TIME SINCE THE LAST GRANT;
or
2) IF ARBITRATION IS FORCED, AND THERE IS NOT A BUS ERROR, AND THE CURRENT BUS TRANSFER HAS COMPLETED;
or
3) IF THERE IS A BUS ERROR;
or
4) IF THE BUS IS GRANTED TO THE PROCESSOR, AND PREEMPT IS ACTIVE, AND THERE HAS BEEN SUFFICIENT TIME SINCE THE LAST GRANT.

SETGRANT
1) IF ARBITRATION IS NOT FORCED, AND THERE HAS BEEN SUFFICIENT TIME FOR ARBITRATION, AND SYNCHRONIZED HOLDA IS ACTIVE, AND REFRESHPENDING IS NOT ACTIVE, AND A REFRESH IS NOT IN PROGRESS;
or
2) IF ARBITRATION IS NOT FORCED, AND THERE HAS BEEN SUFFICIENT TIME FOR ARBITRATION, AND SYNCHRONIZED HOLDA IS NOT ACTIVE, AND REFRESHPENDING IS NOT ACTIVE, AND A REFRESH IS NOT IN PROGRESS, AND THE ARBUS EQUALS F Hex.

NOTE:
A) IF SETARB AND SETGRANT ARE ACTIVE AT THE SAME TIME, SETARB OVERRIDES SET GRANT.

SETHOLDR
1) IF ARB IS NOT FORCED, AND PROCESSOR CYCLES DURING ARBITRATION ARE NOT ALLOWED, AND CAP 110 IS IN ARBITRATION DUE TO A PREEMPT, AND THE CAP IS NOT AT THE POINT OF ENTERING THE GRANT STATE;
or
2) IF THE CAP IS IN THE ARBITRATION STATE, A REFRESH IS PENDING, AND CAP IS NOT AT THE POINT OF ENTERING THE GRANT STATE;
or
3) IF THE CAP IS IN THE ARBITRATION STATE, AND IF ARB IS NOT FORCED, AND PROCESSOR CYCLES DURING ARBITRATION ARE ALLOWED, AND THERE HAS BEEN SUFFICIENT TIME FOR ARBITRATION, AND THE ARBITRATION BUS DOES NOT EQUAL F, AND THERE IS NO SYNCHRONIZED HOLDA.

CLEARHOLDR
1) IF THERE HAS BEEN SUFFICIENT TIME FOR ARBITRATION, AND THE CAP IS IN THE ARBITRATION STATE, AND THE ARBITRATION BUS EQUALS F, AND A REFRESH IS NOT IN PROGRESS;
or
2) IF ARBITRATION IS FORCED, AND THE CAP IS IN THE ARBITRATION STATE, AND A REFRESH IS NOT IN PROGRESS;
or
3) IF PROCESSOR CYCLES DURING ARBITRATION ARE ALLOWED, AND THERE HAS NOT BEEN SUFFICIENT TIME FOR ARBITRATION, AND THE CAP IS IN ARBITRATION.

NOTE:
A) IF SETHOLDR AND CLEARHOLDR ARE ACTIVE AT THE SAME TIME, SETHOLDR OVERRIDES CLEARHOLDR.

DMA devices communicate via DMA channels 135 which comprise well-known channel recognition, masking and transfer control logic. The particular configuration of such channels do not form a part of the present invention.

Figures 1, 3A:
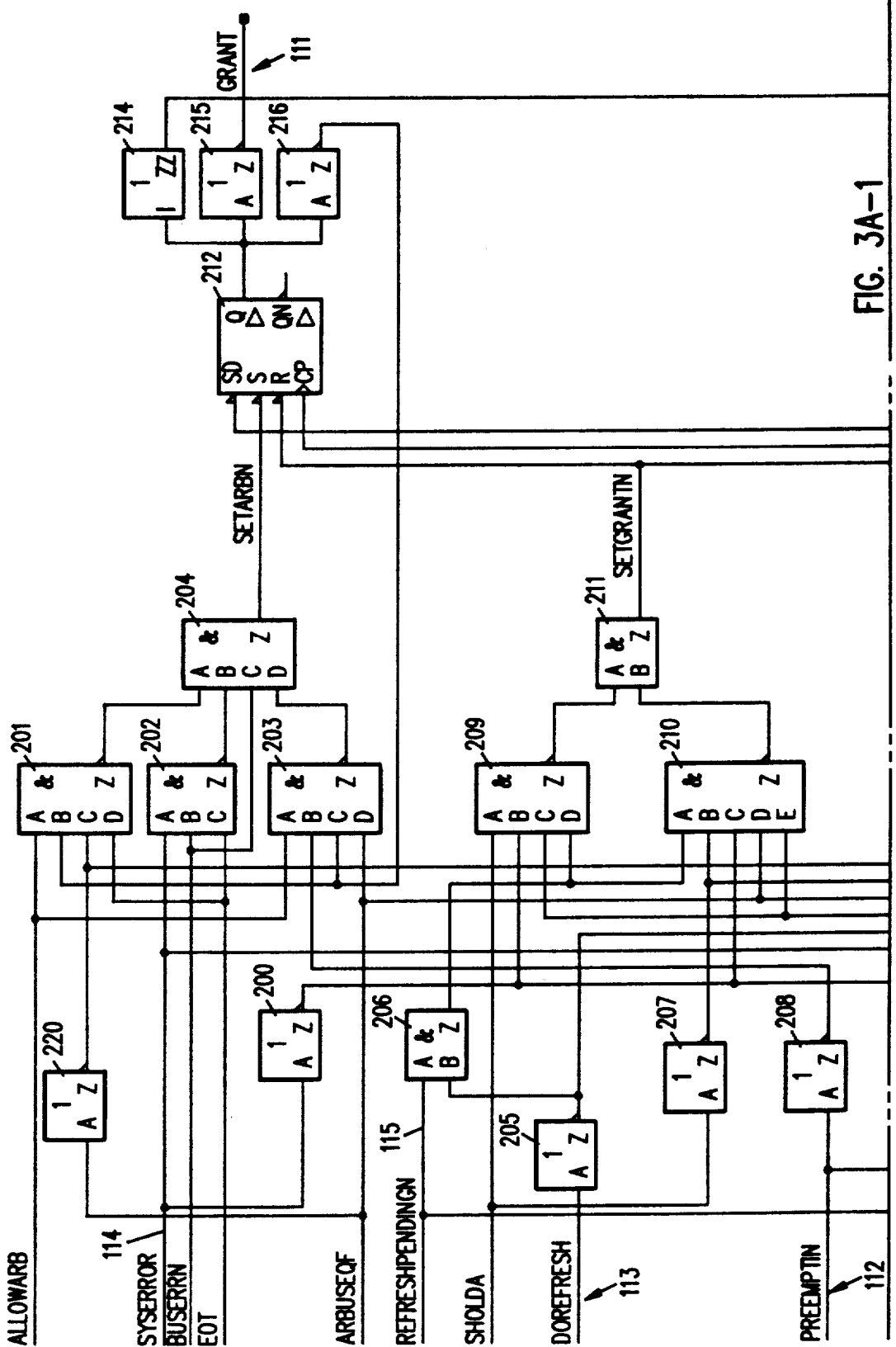
FIG. 3A is a detailed partial circuit diagram of the central arbitration point logic of the network of FIG. 2.
Figures 2, 3A:
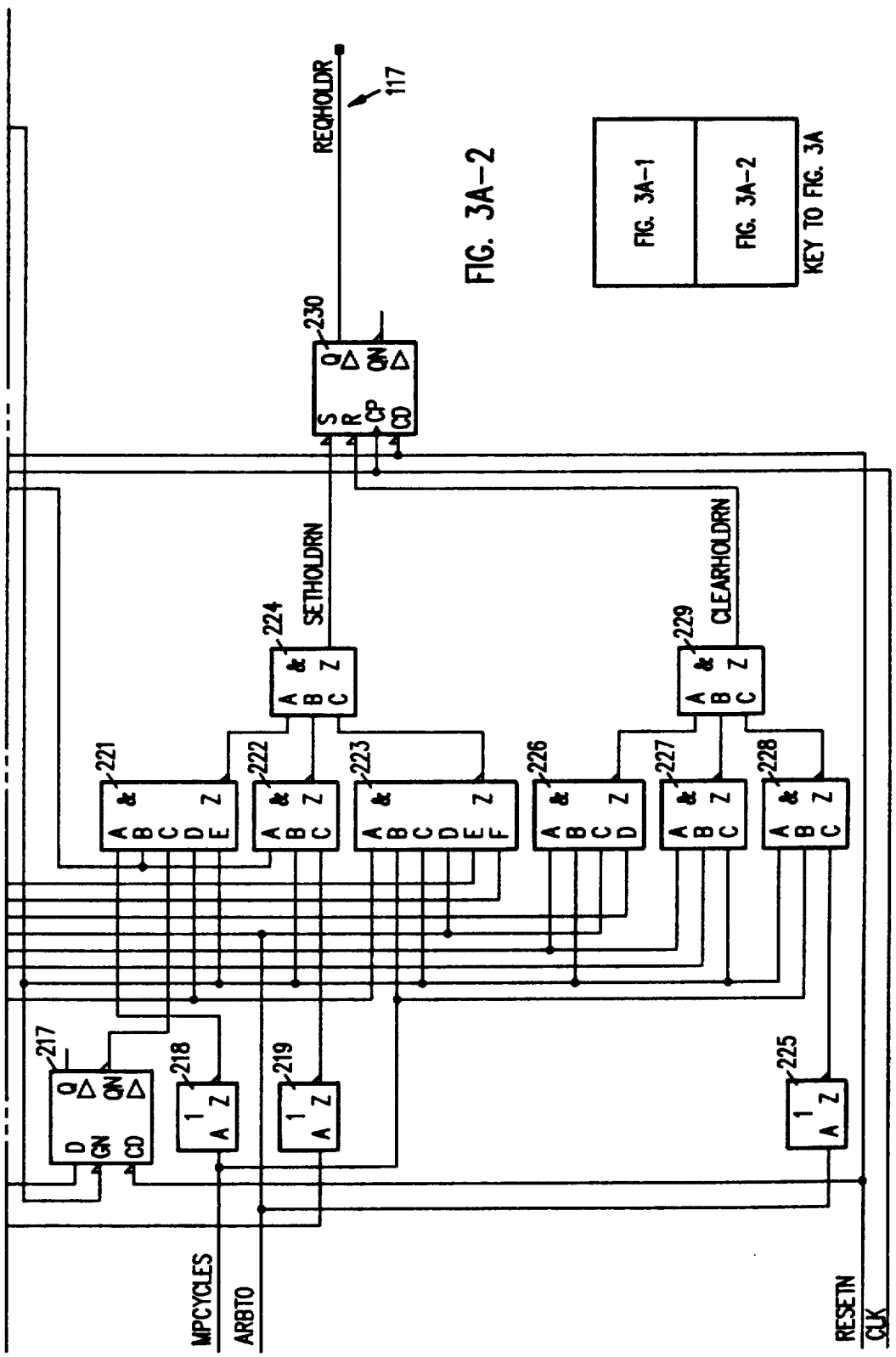

Referring now to FIG. 3A, the signals shown are described as below. In the signal labeling convention of this specification, an "N" at the end of the label indicates that the signal is active and its polarity is negative for this embodiment of the present invention.

GRANT—indicates that CAP and system are in arbitration state or in grant state when low or high, respectively;
ALLOWARB—internal timeout that indicates that sufficient time has passed since the last GRANT;
REFRESHPENDINGN—Active low when refresh controller 125 requests control of the bus until the next refresh cycle begins.
REQHOLDR—a request for HOLDR to be issued from HOLDR/RESET arbitration logic 120;
ARBTO—an internal timeout that indicates that sufficient time has passed for arbitration;
DOREFRESH—the signal indicating that a DRAM REFRESH cycle is in progress;
MPCYCLES—indicates microprocessor cycles enabled or disabled during arbitration when high or low, respectively;
SYSERROR—indicates forced arbitration or arbitration cycles enabled when high or low, respectively;
PREEMPTIN—active low input from system preempt bus 140;
RESETN—active low system reset;
CLK—clock signal for CAP logic 110;
EOT—end of bus transfer, active high;
BUSERR—bus error detected, active low; and
SHOLDA—synchronized HOLDA signal, active low.

As shown in FIG. 3A, the conditions for clearing GRANT signal 111 from flip-flop 212 are determined by gates 201, 202, 204, and 203 in accordance with Equations A, B, C, and D, respectively, given below. Therefore, GRANT signal 111 is false when the conditions of Equations A, B, C, or D are satisfied.

Conversely, as shown in FIG. 3A, the conditions for setting GRANT signal 111 from flip-flop 212 are determined by gates 209 and 210 in accordance with Equations E and F, respectively, given below and by gate 211. Therefore, GRANT signal 111 is true when the conditions of Equations E or F are satisfied and the conditions of Equations A, B, C, or D are not.

As also shown in FIG. 3A, the conditions for setting REQHOLDR signal 117 from flip-flop 230 are determined by gates 221, 222, and 233 in accordance with Equations G, H, and I, respectively, given below and by gate 224. Therefore, GRANT signal 111 is true when the conditions of Equations G, H, or I are satisfied.

Finally, as shown in FIG. 3A, the conditions for clearing REQHOLDR signal 117 from flip-flop 330 are determined by gates 226, 227 and 228 in accordance with Equations J, K and L, respectively, given below and by gate 229. Therefore, GRANT signal 111 is false when the conditions of Equations J, K or L are satisfied and the conditions of Equations G, H, or I are not.

SETARB =
(A)     (ALLOWARB & GRANT & !ARBUSEQF & EOT)
(B)   # (SYSERROR & BUSERRN & EOT)
(C)   # (BUSERR)
(D)   # (ALLOWARB & !PREEMPTIN & GRANT & ARBUSEQF)
SETGRANT =
(E)     (SHOLDA & !SYSERRORN & ARBTO & REFPENDINGN & !DOREFRESH)

| | |
|---|---|
| (F) # | (REFPENDINGN & !DOREFRESH & !SHOLDA & !SYSERROR & ARBUSEQF & ARBTO) |
| SETHOLDR = | |
| (G) | (!MPCYCLES & SETGRANTN & LPREEMPT & !SYSERROR & !GRANT) |
| (H) # | (SETGRANTN & !GRANT & !REFPENDINGN) |
| (I) # | (!SYSERROR & MPCYCLES & !GRANT & ARBTO & !ARBUSEQF & !SHOLDA) |
| CLEARHOLDR = | |
| (J) | (!DOREFRESH & !GRANT & ARBTO & ARBUSEQF) |
| (K) # | (!DOREFRESH & SYSERROR & !GRANT) |
| (L) # | (!GRANT & MPCYCLES & !ARBTO) |

NOTE:
For the above equations, # = LOGICAL OR, & = LOGICAL AND, ! = LOGICAL NOT.

Figure 3B:
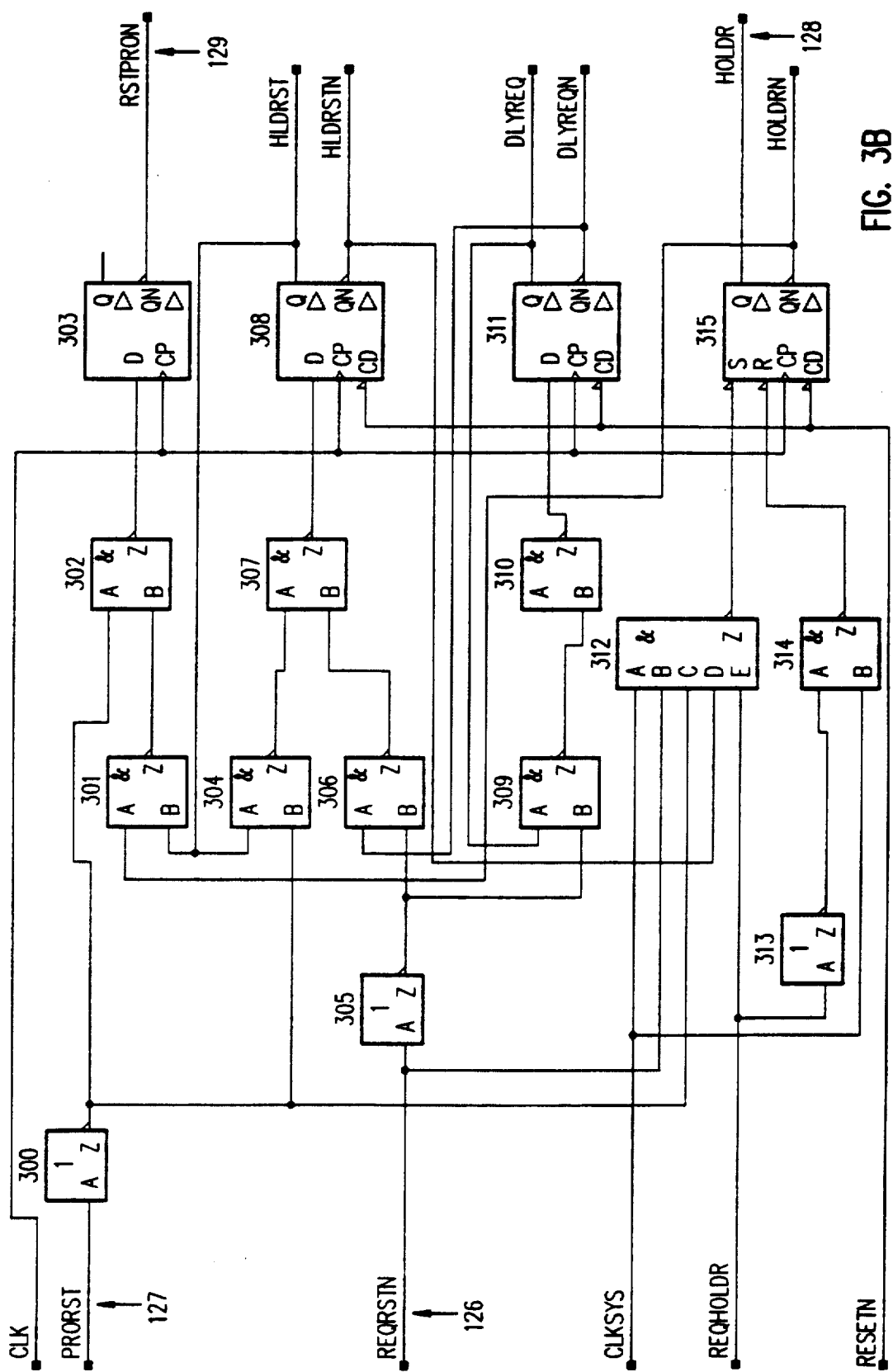
FIG. 3B is a detailed partial circuit diagram of the HOLDR/RESET logic of the network of FIG. 2.

Referring now to FIG. 3B, the signals indicated are described below.

PRORST—the reset signal to the 80386 that is generated by the main data bus controller (not shown);

REQRSTN—the request for a reset to the 80386 that is generated from multiple sources (i.e. from software, from the keyboard, etc.);

REQHOLDR—the request for the 80386 to be put in "hold" when CAP logic 110 wants control of the system bus for a device other than the processor;

RSTPRON—the request from the HOLDR/RESET arbitration logic 120 to the main data bus controller to issue a reset signal to the 80386;

HLDRST—the output of the flip-flop 308 which detects and remembers that a request for a processor reset has been issued (REQRSTN);

DLYREQ—this is the HLDRST signal delayed by one clock time interval and is used to form a pulse so that if the incoming REQRSTN signal is longer than the time required to respond and issue a PRORST, the reset-hold circuit will not continue to respond to the same REQRSTPRON stimulus; and HOLDR—the output of flip-flop 315, the actual hold request signal applied to the microprocessor, which is set after a request for a "hold" has been issued, the current PRORST is finished and no PRORST is pending.

With continuing reference to FIG. 3B, when the micro-computer is turned on, the power-on reset sequence preconditions flip-flops 308, 311 and 315 to their clear state. If a REQHOLDR is issued and there is no PRORST, REQRSTN or HLDRST active, then HOLDR flip-flop 315 is set via gate 312 to issue the HOLDR signal to the processor. If a REQHOLDR is issued and there is either a PRORST active or a REQRSTN active or a HLDRST pending, then gate 312 holds off setting HOLDR flip-flop 315 until the processor RESET or pending processor RESET is complete.

When a REQRSTN is issued, HLDRST flip-flop 308 is set via gates 304, 306 and 307. Flip-flop 311 sets one clock later via flip-flop 308 and gate 309, and truncates the input to flip-flop 308 via gates 306 and 307. The HLDRST signal will immediately set RST386 flip-flop 303 via gates 301 and 302 if there is no HOLDR active. If HOLDR is active, then gate 301 holds off setting RSTPRON flip-flop 303 until HOLDR is complete.

Referring again to FIGS. 2, 3A and 3B, the function of CAP 110 of the present invention is to control the ownership of the system bus among system processor 160, refresh controller 125, DMA slaves, or bus masters. A DMA slave or bus master is given control of the bus (i.e., "granted" the bus) when 1) it has requested control of the bus by asserting PREEMPTN 140 prior to the arbitration cycle; 2) the four bit arbitration value of the device is equal to the value on four-bit ARBUS 150; and ARB/GRANTN signal 130 is in the GRANT state. Refresh controller 125 has control of the bus when 1) it has requested control of the bus with a preempt; 2) the processor has relinquished control of the bus; and 3) the system is in the arbitrate state. The system processor gains control of the bus by default whenever no other device needs the bus.

If another DMA slave or a bus master is in control of the bus when PREEMPTN signal 140 is asserted, that DMA slave or bus master must terminate, in a controlled manner, its bus activity. CAP 110 then waits for the current bus activity to terminate and switches ARB/GRANTN signal 130 to the ARBITRATE state. When the system is in the arbitrate state, every device that requested the bus by issuing PREEMPTN 140 prior to the system entering the arbitrate state can compete for bus ownership. A device must have issued PREEMPTN signal 140 prior to the ARBITRATION state in order to compete. The competing device with the lowest arbitration value always wins the arbitration. However, the winning device does not control the system bus until CAP 110 switches ARB/GRANTN signal 130 to the GRANT state. DMA controller channels 1-3, and 5-7 respond to arbitration values of 1-3, and 5-7, respectively. DMA controller channels 0 and 4 can be programmed to respond to any arbitration value except F Hex. Bus masters may have any arbitration value except F Hex.

When a DMA slave or a bus master finishes with the bus, CAP 110 enters the ARBITRATE state. If other devices indicate that they want the bus by issuing PREEMPTN signal 140 before the ARBITRATE state is entered, the arbitration cycle continues as above. However, if PREEMPTN signal 140 was not active before the ARBITRATE state was entered, CAP 110 returns control of the bus to the processor since no device is competing and the arbitration bus defaults to F Hex.

CAP 110 obtains control of the bus from system processor 160 in order to grant it to other devices by requesting that the processor enter the HOLD condition. HOLD condition is requested by asserting HOLDR and returns control of the bus to the processor by de-asserting HOLDR. Control of the bus is returned to and obtained from the processor only during the ARBITRATE state.

When the REFRESH controller 125 requires the bus in order to perform a refresh operation, it issues PREEMPTN signal 140 so that other devices will relinquish the bus, and issues REFRESHPENDINGN signal 115 to CAP 110 to indicate that a refresh operation is pending. CAP 110 then waits for the current bus activity to terminate, then switches ARB/GRANTN signal 130 to the ARBITRATE state. CAP 110 then asserts HOLDR and when the processor enters the HOLD condition, the REFRESH controller completes the refresh cycle.

While the system is in the ARBITRATE state, any DMA slave or bus master may compete for the bus by the above-described method. However, the bus will not be granted to the winning device until the REFRESH cycle is complete.

If SYSERROR 114 is active, CAP 110 is forced into the ARBITRATE state at that end of the current bus activity, and then the only devices that may own, i.e. control, the bus are the system processor and the REFRESH controller. A bus error is a special system error that relates to bus ownership. Bus errors force CAP 110 to enter the ARBITRATE state immediately (FORCED ARB).

Figure 4A:
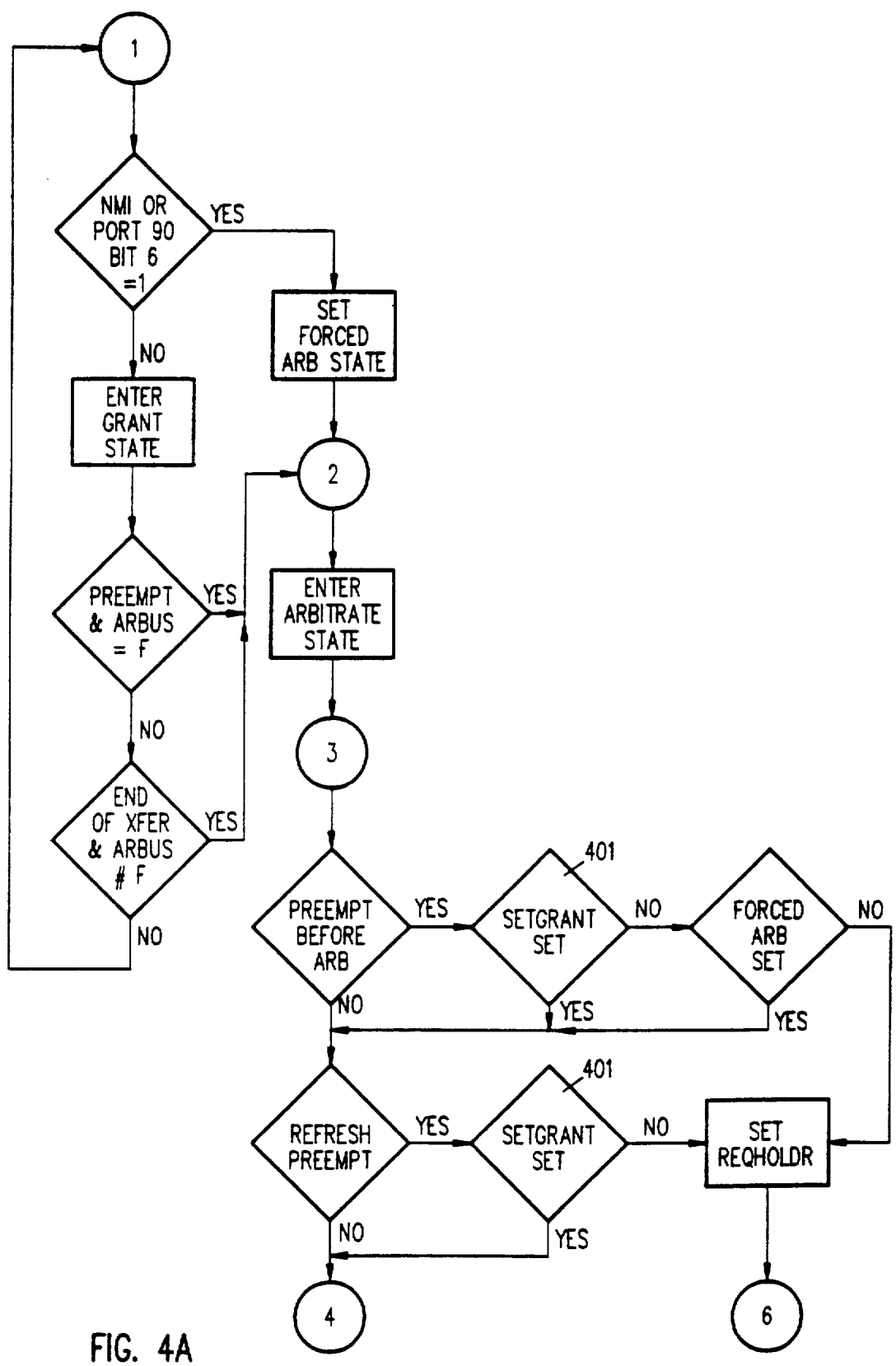
FIGS. 4A and 4B is a flow diagram of operations performed by the central arbitration point logic of the network of FIG. 2.
Figure 4B:
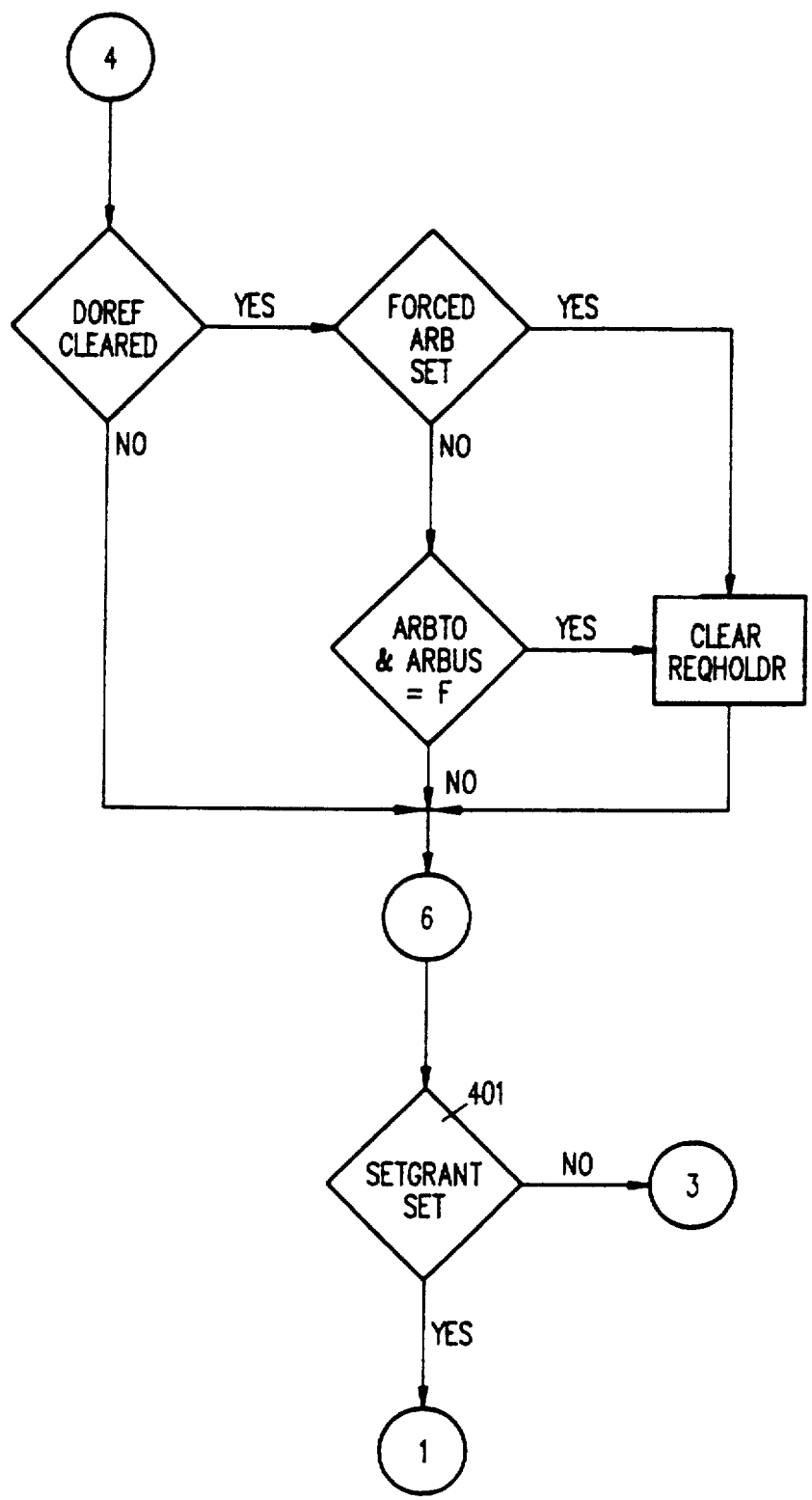

CAP logic 110 controls access of DMA slaves, bus masters and refresh controller 125 to system memory and other system components via the MCA in accordance with the flow diagrams shown in FIGS. 4A and 4B. If CAP logic 110 is not in forced arbitration (FORCED ARB), REQHOLDR is set when refresh controller 125 or a DMA slave or bus master requests control of the MCA. GRANT state and ARBITRATION state are designated by the level of the system signal GRANTN. Arbitration for DMA devices is not complete until HOLDA signal is active. DMA transfers occur only when HOLDA signal is active and CAP logic 110 is in GRANT state. In the convention of the present specification, all diamond shaped decision blocks take zero time.

Figure 5:
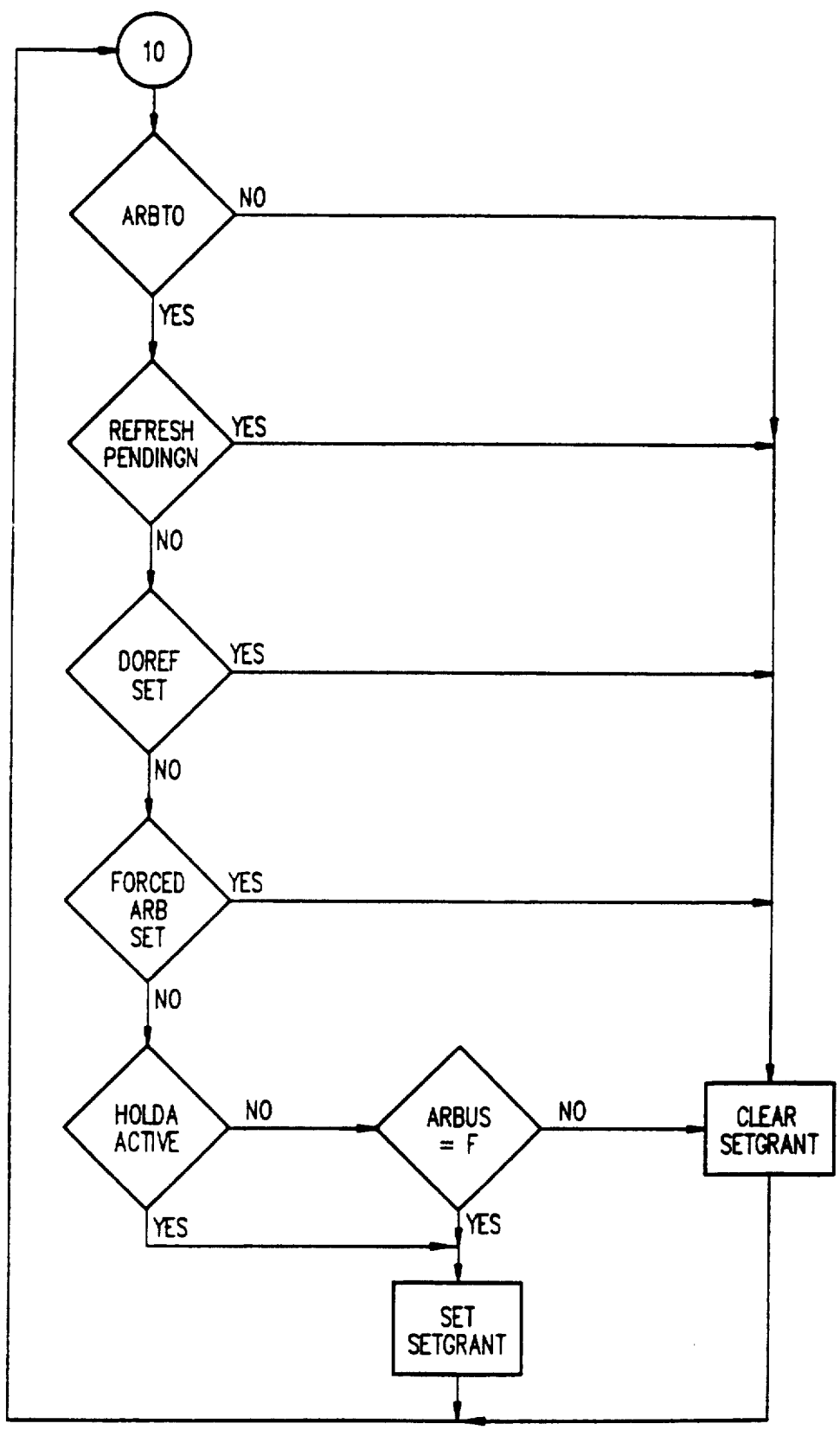
FIG. 5 is a flow diagram of the SETGRANT operation of FIGS. 4A and 4B.
Figure 6:
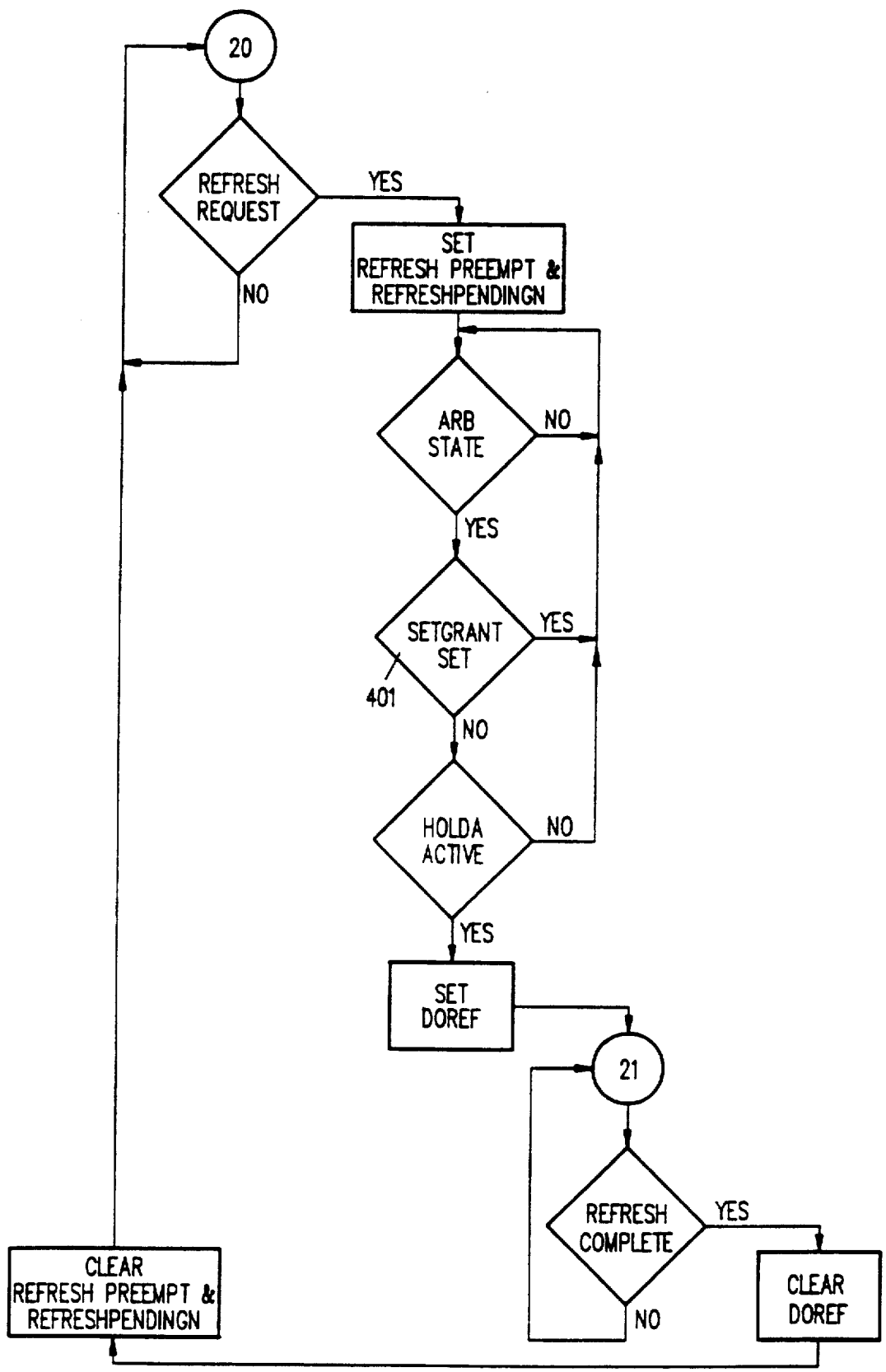
FIG. 6 is a flow diagram of the REFRESH PREEMPT operation of FIG. 4A.

FIG. 5A is a flow diagram of the SETGRANT operation shown in FIGS. 4A and 4B. FIG. 6 is a flow diagram of the REFRESH-PREEMPT operation as also shown in FIG. 4A.

The timing for signals controlling access to the microprocessor in a microcomputer system according to the present invention is shown in FIGS. 7A-7F and 8A-8C. Referring first to FIGS. 7A-7F, REFRESHPREEMPTN is the component of PREEMPTIN arising from a request for the bus by refresh controller 125; and CHNL. PREEMPTN is the component of PREEMPTIN arising from a request for the bus by a DMA slave or bus master.

Figure 7A:
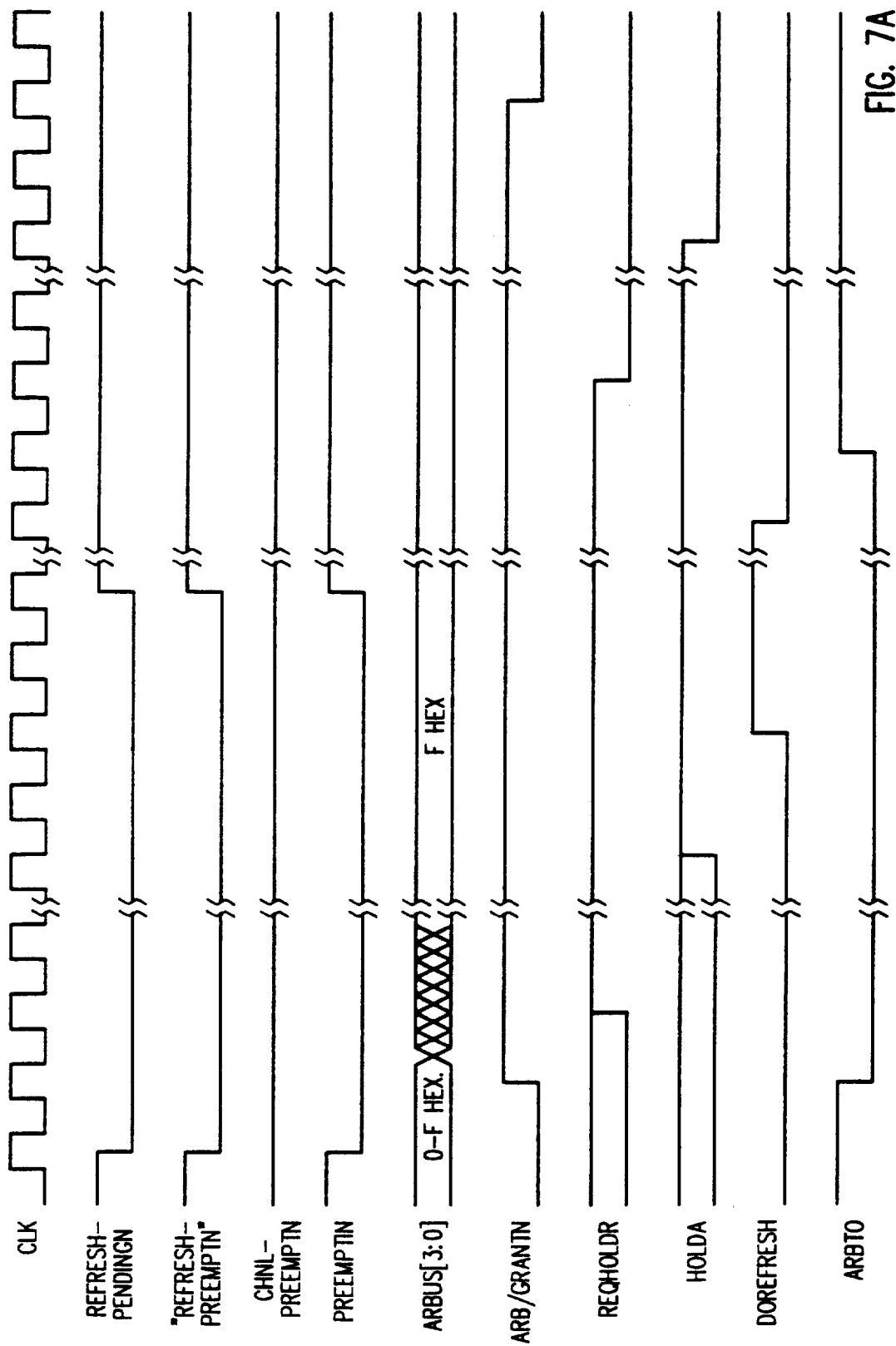
FIGS. 7A-7F are timing diagrams for selected signals related to operation of the central arbitration point logic of FIG. 3A.
Figure 7B:
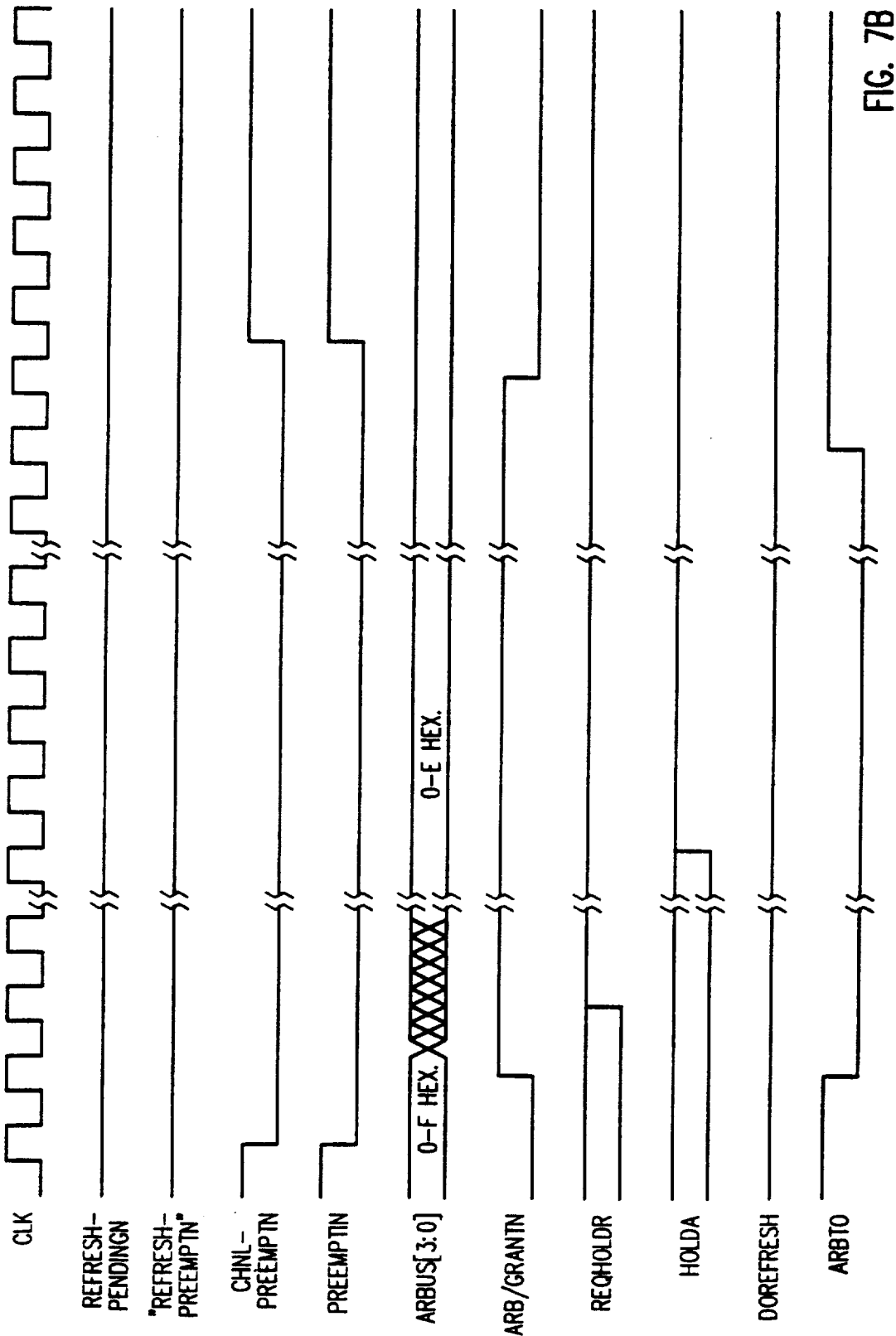

In FIG. 7A, refresh controller 125 is requesting and obtaining control of the bus from processor 160, a DMA slave or a bus master. FIG. 7B shows a DMA slave or bus master requesting and obtaining control of the bus from processor 160, or an other a DMA slave or a bus master.

Figure 7C:
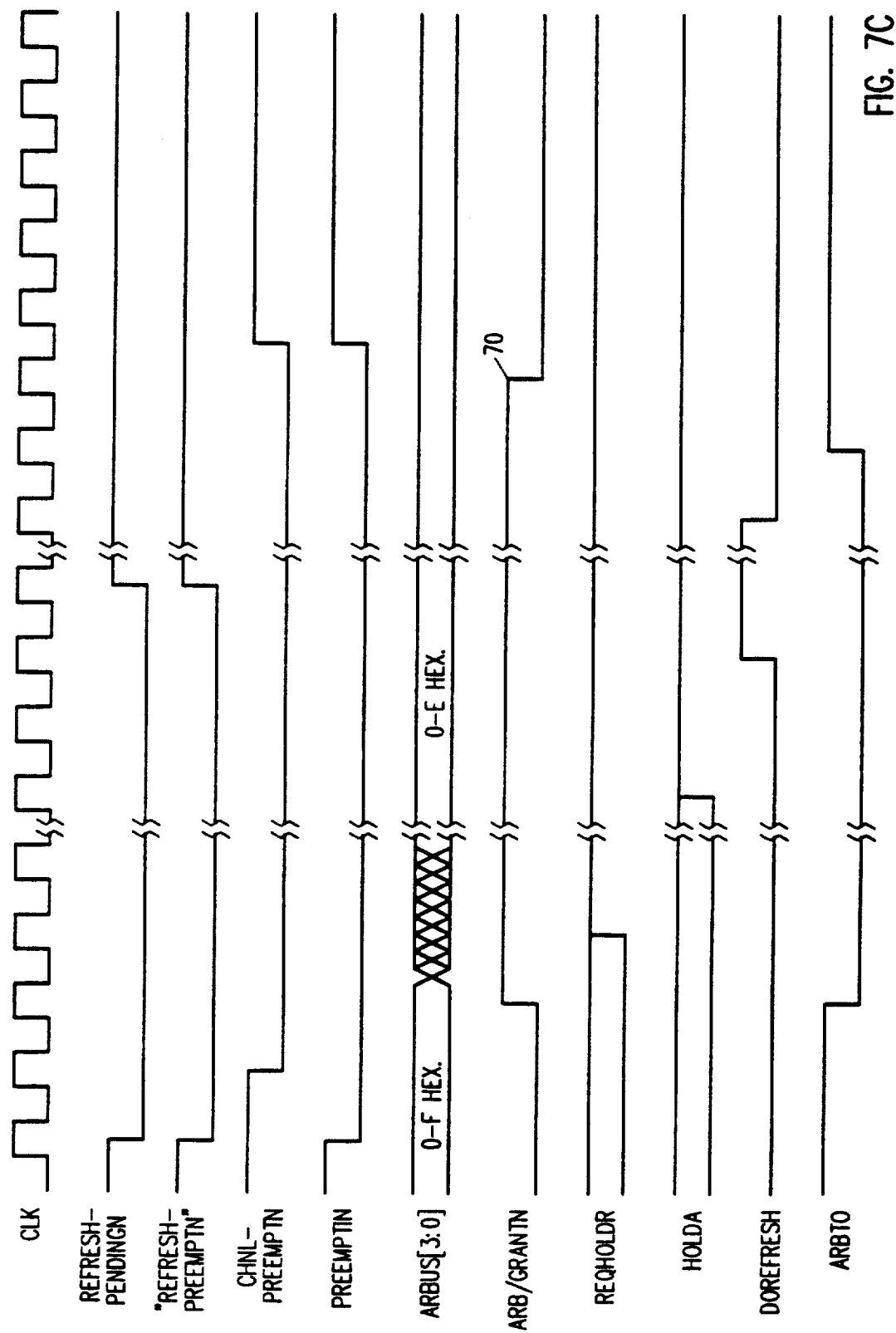

FIG. 7C shows refresh controller 125 and a DMA slave or bus master requesting the bus from processor 160, or an other DMA slave or bus master, with refresh controller 125 issuing REFRESHPREEMPTN first. The refresh operation occurs during the arbitration state and the DMA slave or bus master gains control of the bus at grant 70.

Figure 7D:
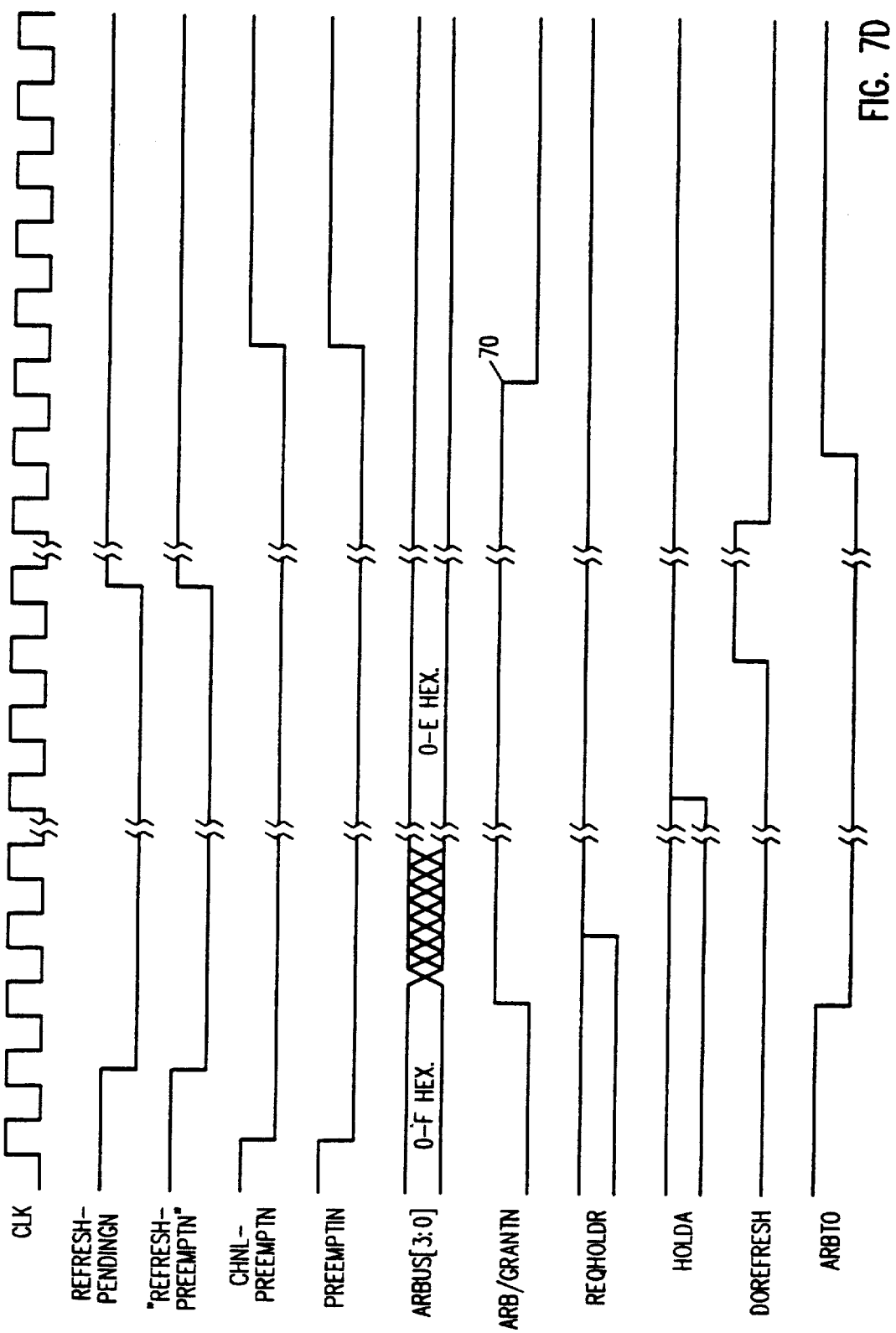

Referring now to FIG. 7D, refresh controller 125 and a DMA slave or bus master are requesting the bus from processor 160, or an other DMA slave or bus master, with the DMA slave or bus master issuing its preempt first. The refresh operation occurs during the arbitration state and the DMA slave or bus master gains control of the bus at the grant 70.

Figure 7E:
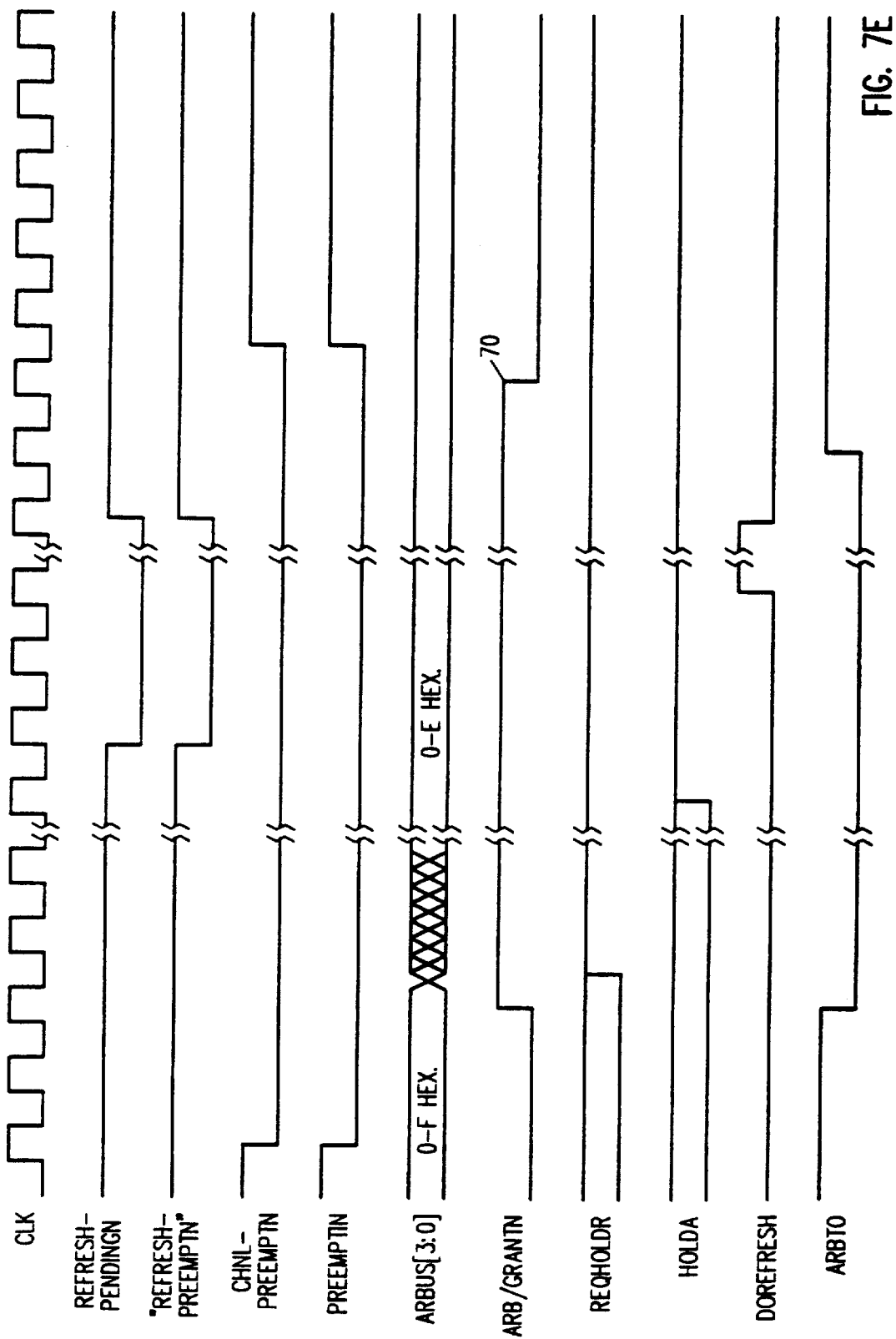
Figure 7F:
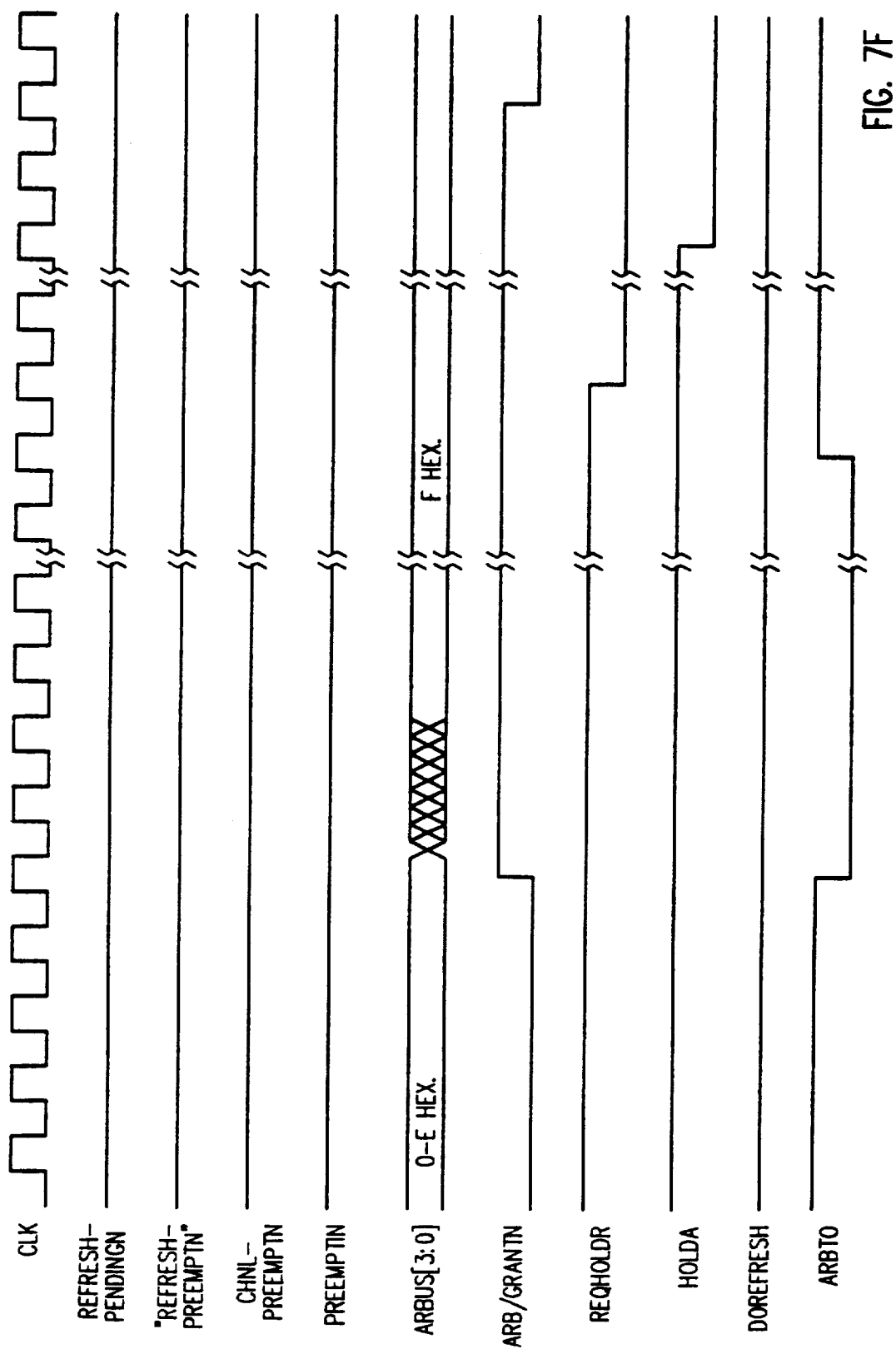

FIG. 7E shows refresh controller 125 and a DMA slave or bus master requesting the bus from processor 160 or an other DMA slave or bus master, with the DMA slave or bus master issuing its preempt first and the refresh controller issuing REFRESHPREEMPTN after the start of the arbitration cycle but before ARBTO has occurred. The refresh operation occurs during the arbitration state and the DMA slave or bus master gains control of the bus at grant 70. Finally, FIG. 7F shows a DMA slave or bus master ending its control of the bus after completion of the transfer and control of the bus reverts to processor 160 at grant 70.

Figure 8A:
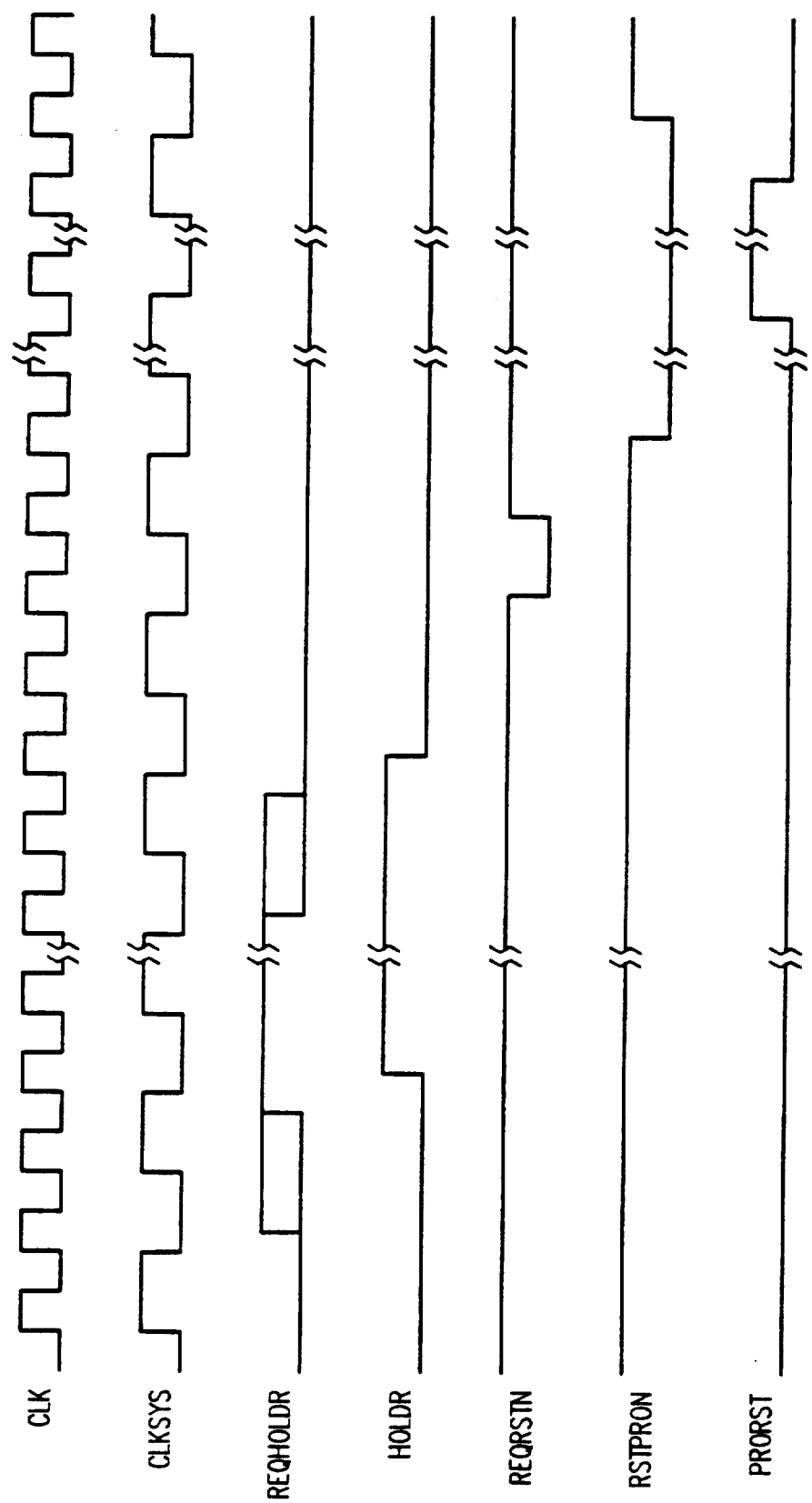
FIGS. 8A-8C are timing diagrams for selected signals related to operation of the HOLDR/RESET logic of FIG. 3B.
Figure 8B:
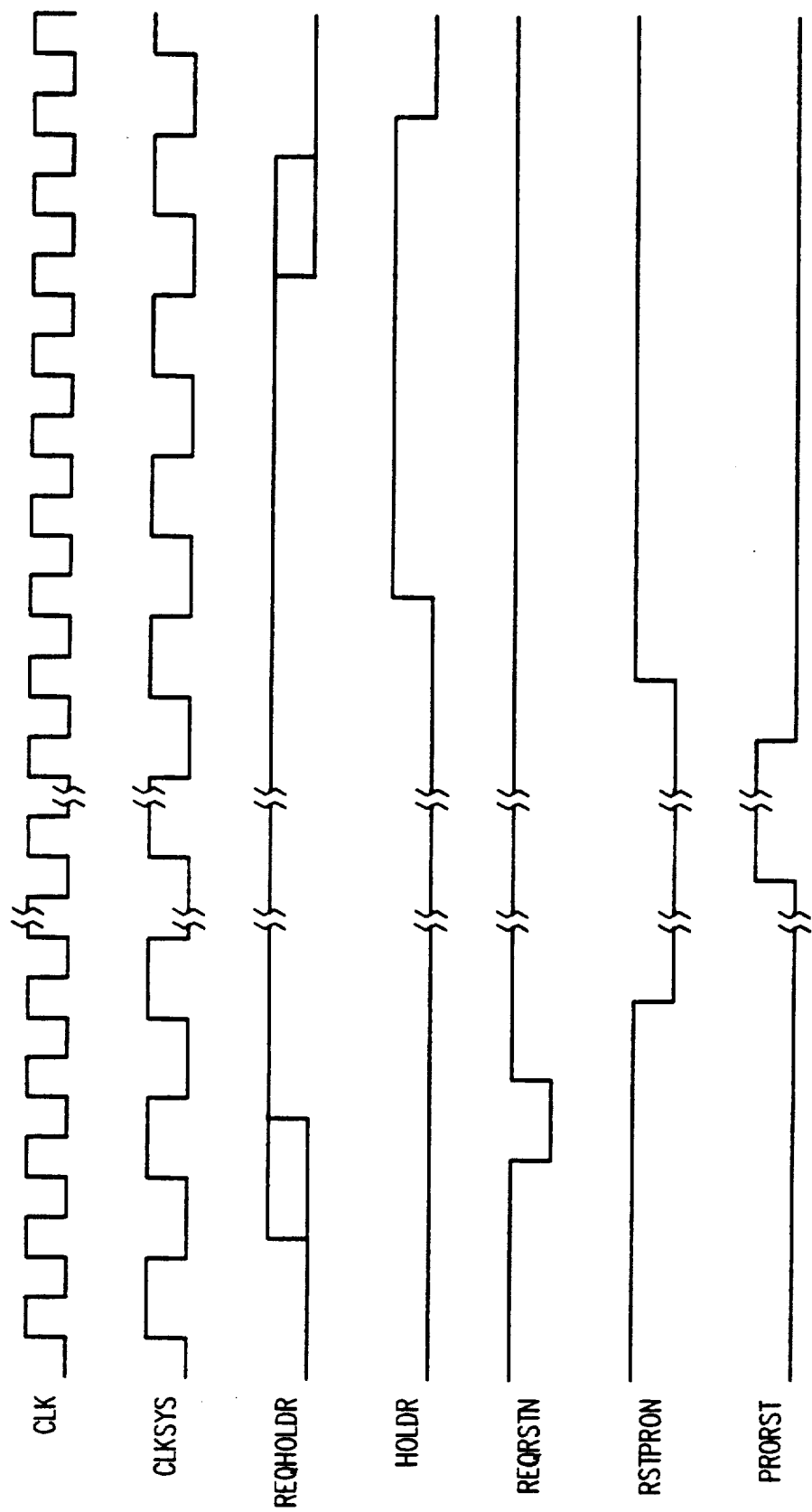
Figure 8C:
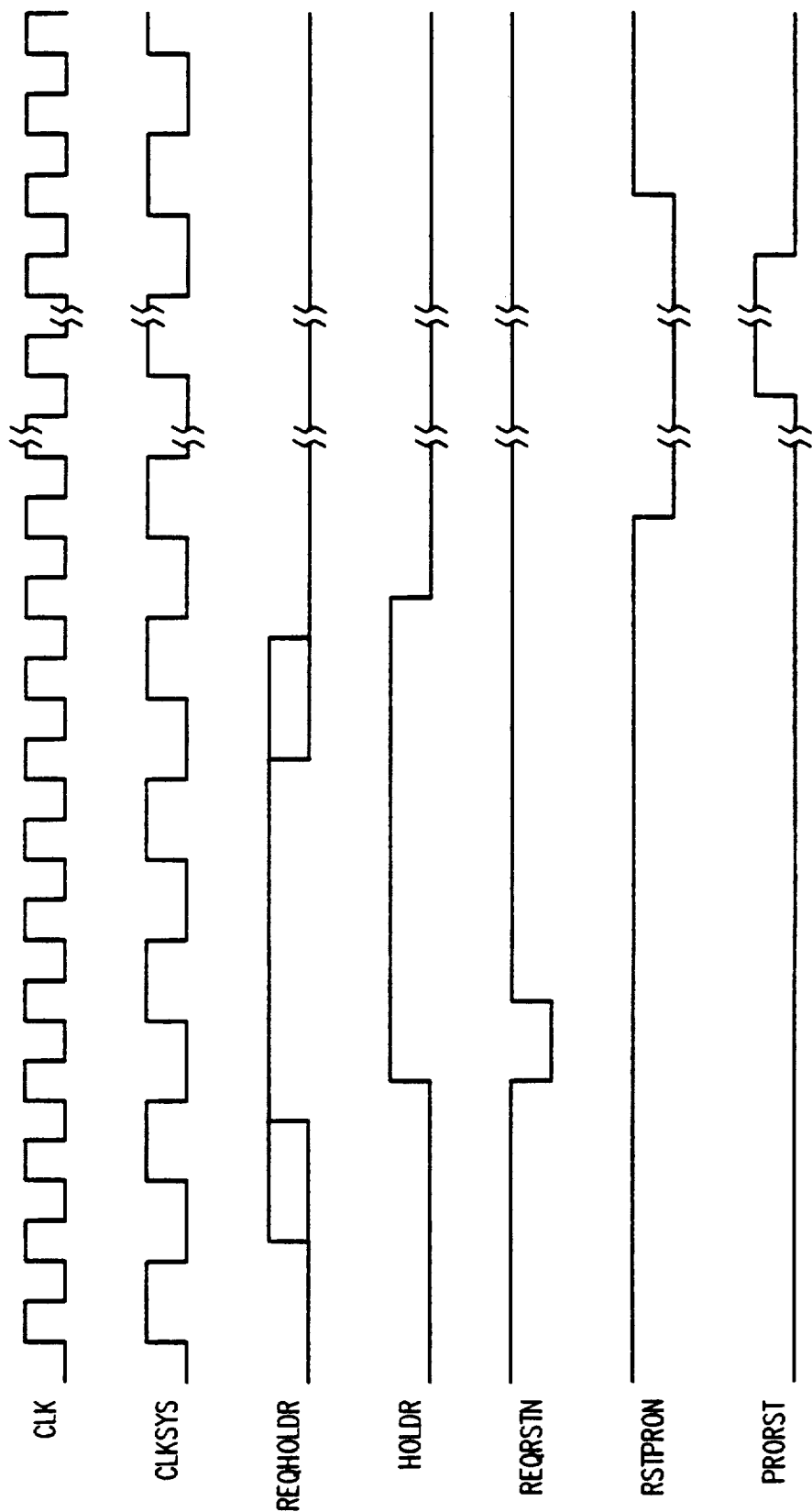

With reference to FIG. 8A, separate HOLDR and CPU reset cycles are shown. FIG. 8B shows simultaneous REQHOLDR and REQRSTN with the CPU reset occurring first followed by HOLDR. FIG. 8C shows REQHOLDR slightly before REQRSTN with the HOLDR occurring first and then the CPU reset.

The present invention has been described with reference to a preferred embodiment. However, those skilled in the art and familiar with the disclosure of the present invention will recognize that changes in form and detail may be made without departing from the spirit of the invention, or exceeding the scope of the appended claims.

We claim:

1. In a computer system, a subsystem for accessing a high speed central processing unit, said central processing unit having real and protected modes; said subsystem comprising:
   first control means responsive to periodic dynamic memory refresh cycles for producing a first request for a central processing unit hold request;
   second control means responsive to DMA slave or bus master operations for producing a second request for a central processing unit hold request; and
   logic means coupled to said first and second control means for producing central processing unit hold requests in response to said first and second requests for a central processing unit hold request and for preempting said DMA slave or bus master operations if said first request for a central processing unit hold request is initiated during said DMA slave or bus master operations.

2. A subsystem as in claim 1 wherein said logic means further includes:
   switching means for switching the central processing unit from the real to the protected mode and from the protected to the real mode, said switching means generating a central processing unit reset cycle for returning the central processing unit from the protected to the real mode; and
   detection means coupled to said switching means for detecting and retaining said central processing unit hold requests received during central processing unit reset cycles for executing said last-mentioned central processing unit hold requests at a later time.

3. The subsystem as in claim 2 wherein said detection means further detects and retains a central processing unit reset instruction for execution at a later time in the event a central processing unit hold request is being processed at the time the central processing unit reset instruction is received.

4. In a computer system having a high speed central processing unit, said central processing unit having real and protected modes, a subsystem comprising:
   first control means responsive to periodic dynamic memory refresh cycles for producing a first request for a central processing unit hold request;

second control means responsive to DMA slave or bus master operations for producing a second request for a central processing unit hold request;

logic means coupled to said first and second control means for producing a central processing unit hold request in response to said first and second requests for a central processing unit hold request;

switching means for switching the central processing unit from the real to the protected mode and from the protected to real mode, said switching means generating a central processing unit reset cycle for returning the central processing unit from the protected to the real mode; and detection means coupled to said logic means for detecting and retaining a central processing unit hold request during a central processing unit reset cycle for executing said central processing unit hold request at a later time.

5. The subsystem as in claim 4 wherein said detection means further detects and retains a central processing unit reset instruction for execution at a later time in the event a central processing unit hold request is being processed at the time a central processing unit reset instruction is received.

6. In a computer system, a method for accessing a high speed central processing unit, said central processing unit having real and protected modes, said method comprising the steps of:
producing a first request for a central processing unit hold request in response to periodic dynamic memory refresh cycles;
producing a second request for a central processing unit hold request in response to DMA slave or bus master operations;
producing central processing unit hold requests in response to said first and second requests for a central processing unit hold request; and
preempting said other system operations if said first request for a central processing unit hold request is initiated during said DMA slave or bus master operations.

7. A method as in claim 6 further including the steps of: generating central processing unit reset cycles for returning the microprocessor from the protected to the real mode; and
detecting and retaining said central processing unit hold requests received during central processing unit reset cycles for executing said last-mentioned central processing unit hold requests at a later time.

8. The method as in claim 7 further including the step of detecting and retaining a central processing unit reset instruction for execution at a later time in the event a central processing unit hold request is being processed at the time the central processing unit reset instruction is received.

9. In a computer system, a method for accessing a high speed central processing unit, said central processing unit having real and protected modes, said method comprising the steps of:
producing a first request for a central processing unit hold request in response to periodic dynamic memory refresh cycles;
producing a second request for a central processing unit hold request in response to DMA slave or bus master operations;
producing a central processing unit hold request in response to said first request for a central processing unit hold request; producing a central processing unit hold request in response to said second request for a central processing unit hold request;
generating a central processing unit reset cycle for returning the central processing unit from the protected to the real mode; and
detecting and retaining said central processing unit hold request during a central processing unit reset cycle for executing said central processing unit hold request at a later time.

10. The method as in claim 9 further including the step of detecting and retaining a central processing unit reset instruction for execution at a later time in the event a central processing unit hold request is being processed at the time a central processing unit reset instruction is received.

11. In a computer system having a high speed central processing unit, said central processing unit having real and protected modes, a subsystem for accessing said central processing unit comprising:
control means for halting central processing unit operation in response to central processing unit hold requests, for generating central processing unit reset cycles for returning said central processing unit from the protected to the real mode and for initiating memory refresh cycles;
logic means, coupled to said control means, for producing first central processing unit hold requests in response to periodic dynamic memory refresh cycles and for producing second central processing unit hold requests in response to DMA slave or bus master operations;
said logic means allowing a memory refresh cycle or DMA slave or bus master operation to finish if said memory refresh cycle or DMA slave or bus master operation is in progress when a microprocessor reset cycle is initiated;
said logic means allowing a reset cycle to finish if said reset cycle is in progress when a memory refresh cycle or DMA slave or bus master operation is initiated; and
said logic means delaying said second central processing unit hold request if a memory refresh cycle is initiated during processing of said last-mentioned second central processing unit hold request until said memory refresh cycle is completed.

12. In a computer system having a high speed central processing unit, said central processing unit having real and protected modes, a method for accessing said central processing unit comprising the steps of:
halting central processing unit operation in response to central processing unit hold requests;
generating central processing unit reset cycles for returning said central processing unit from the protected to the real mode;
initiating memory refresh cycles;
producing first central processing unit hold requests in response to periodic dynamic memory refresh cycles;
producing second central processing unit hold requests in response to DMA slave or bus master operations;
allowing a memory refresh cycle or DMA slave or bus master operation to finish if said memory refresh cycle or DMA slave or bus master operation is in progress when a microprocessor reset cycle is initiated;
allowing a reset cycle to finish if said reset cycle is in progress when a memory refresh cycle or DMA slave or bus master operation is initiated; and
delaying said second central processing unit hold request if a memory refresh cycle is initiated during processing of said last-mentioned second central processing unit hold request until said memory refresh cycle is complete.

* * * * *